United States Patent Office 2,701,264
Patented Feb. 1, 1955

2,701,264

SEPARATION OF ALCOHOLS AND OTHER IMPURITIES FROM KETONES

Thomas J. Deahl, Orinda, and Harry de V. Finch, Berkeley, Calif., assignors to Shell Development Company, Emeryville, Calif., a corporation of Delaware No Drawing. Application October 1, 1951,
Serial No. 249,208

8 Claims. (Cl. 260—596)

This invention relates to a method for recovering ketones from close-boiling mixtures thereof with alcohols and other compounds.

A number of organic syntheses are productive of oxygenated compounds wherein two or more of such compounds boil so close to one another as to prevent their efficient separation by fractional distillation methods. While with some of these mixtures the desired separation can be effected by adding water or other azeotrope-forming agent, this is not the case with compositions made up of close-boiling alcohols and ketones since the latter form ternary azeotropes with the alcohol and the water or other entrainer and so defeat the purpose of the method.

Ketones are technically important chemicals which are coming to be used on an ever increasing scale. The higher ketones containing seven or more carbon atoms, for example, have been demonstrated to be excellent lacquer solvents. For this, as well as in many other applications, it is essential that the ketone be as free as possible of impurities, and especially of alcohols and of any unsaturated components. Accordingly, it is an object of this invention to provide an effective, and relatively inexpensive method for separating saturated ketones of relatively high purity from mixtures thereof with alcohols, or with alcohols and various unsaturated compounds, whose boiling point is near that of the desired ketone products. A more particular object is to provide a method for recovering saturated $C_7$ and higher ketones from mixtures thereof with close-boiling alcohols and unsaturated products. The nature of still other objects of the invention will be apparent from a consideration of the descriptive portion to follow.

We have discovered that when a mixture containing close-boiling alcohols and ketones is passed over a catalyst of the hydrogenation-dehydrogenation type at a relatively low pressure and at a high reaction temperature, the alcohols present in the mixture are converted to ketones having the same number of carbon atoms as the alcohol. The ketones which are formed in this manner have a boiling point which is well removed from that of the other ketone components of the mixture, and the various ketones now present in the mixture can readily be separated from one another by simple distillation methods. Further, passing the alcohol-ketone mixture over the catalyst under the conditions described above has the effect of saturating any unsaturated components which were formerly present in the mixture, the unsaturated components being normally converted to saturated products which can be separated as the mixture is subjected to fractional distillation.

The method of the present invention is applicable to the treatment of mixtures containing close-boiling alcohols and ketones, as produced by a wide variety of different processes. One such mixture, for example, is that formed by a practice of the Fischer-Tropsch synthesis wherein carbon monoxide is reacted with hydrogen. This synthesis is productive of a large number of different compounds, including various close-boiling alcohols and ketones such as isopropyl alcohol (B. P. 82.3° C.) and methyl ethyl ketone (B. P. 79.6° C.); sec. butyl alcohol (B. P. 99.5° C.) and methyl propyl ketone (102.3° C.); and sec. amyl alcohol (B. P. 119.9° C.) and methyl isobutyl ketone (B. P. 116° C.). Another process which is productive of mixtures containing close-boiling alcohols and ketones, as well as unsaturates, is that wherein a ketone is reacted with an alcohol to produce a higher ketone. Thus, reaction of methyl isobutyl ketone (a $C_6$ ketone) with methanol under appropriate reaction conditions is largely productive of ethyl isobutyl ketone (a $C_7$ ketone), though the reaction mixture also contains a substantial portion of the unreacted $C_6$ ketone and of the corresponding $C_6$ alcohol (2-methylpentan-4-ol), together with a $C_7$ alcohol (2-methylhexan-4-ol), a $C_8$ ketone (isobutyl isopropyl ketone), and a $C_8$ unsaturated ketone (2-methyl-5-hexene-4-one). While the $C_6$ ketone boils at 115.9° C., the $C_6$ alcohol, with a boiling point of 131.6° C., boils close to the $C_7$ ketone (B. P. 136.5° C.). Again, the $C_7$ alcohol boils at 147° C., whereas the saturated and unsaturated $C_8$ ketones have substantially this same boiling point (147° C.). These close-boiling constituents can not be efficiently separated from one another by fractional distillation means.

Reaction mixtures of the foregoing variety can be subjected in their entirety to the process of the present invention, or they can first be fractionally distilled to provide the desired cuts, with one or more of the latter then being passed over the hydrogenation-dehydrogenation catalyst. Whatever the source of the ketone-alcohol containing feed-mixture, the process of this invention requires that the latter be passed in the gaseous phase through a catalyst having hydrogenating-dehydrogenating characteristics. Vaporization of the feed can be effected either by preheating the same prior to introducing the vapors into the catalyst-containing reaction chamber, or by maintaining the latter at an elevated temperature and then so adjusting the flow of incoming feed mixture as to rapidly vaporize the same.

The process of the present invention can be conducted at any temperature above 200° C., yet below that temperature where appreciable decomposition of the gases under treatment ensues. Preferably, temperatures between 275 and 550° C. are employed. The operation proceeds at atmospheric or even at sub-atmospheric pressures, though good results can also be obtained by using moderately elevated pressures, i. e., to about 100 p. s. i. g. A preferred pressure range is from about 15 to 50 p. s. i. g.

The rate at which the feed mixture is passed through the catalyst, is not critical and can be varied within wide limits. Thus, good results have been obtained at a LHSV of from about 0.1 to 8. The term LHSV here represents "liquid hourly space velocity," and designates the number of volumes of the feed mixture (measured as liquid) passed through the catalyst per hour per nominal volume of catalyst. A preferred LHSV is from 1 to 5.

Any material which is active as a hydrogenation-dehydrogenation catalyst can be used in the process of this invention. Representative catalysts falling into this category are activated copper, nickel, cobalt, iron, platinum, palladium, zinc, cadmium, manganese, lead, tin, silver, brass, chromium, alumina, iron oxide-chromium oxide and copper oxide-chromium oxide compositions, copper on calcined diatomaceous earths, and the like. Brass is the most suitable of these catalysts. For the purposes of the present invention, the term "brass" is employed herein to designate the various alloys of copper and zinc.

The ketone or ketones which are present in the product obtained by passing the feed mixture over the above-defined catalyst can then be separated from the other components of the product in any desired manner. Thus, the liquid product condensed from the stream leaving the reactor can be passed to a distillation column where the lower boiling ketone formed from the alcohol passes overhead, while the desired higher boiling ketone is taken off as bottoms.

The process of this invention is illustrated in various of its embodiments by the following examples:

Example 1

In this operation methyl isobutyl ketone and methanol (in the ratio of 2 moles of the ketone per mole of the alcohol) were reacted at elevated conditions of temperature and pressure in the presence of a copper-alumina catalyst. The resulting product stream so obtained was fractionated and a cut obtained which boiled between 128 and 134° C. A portion of this cut containing 0.65 mole $C_6$ alcohol and 0.44 mole $C_7$ ketone (together with small amounts of unsaturates, as evidenced by a Bromine No. (g./100 g.) of 5.3) was then heated to approximately 500° C. and the resulting vapors were passed over small brass (53% Cu–47% Zn) fragments at atmospheric pressure and at flow rate (LHSV) of 1.8. The resulting product stream was then separated by fractionation in a 20-plate column, there being recovered, as separate fractions, 0.44 mole $C_7$ ketone, 0.62 mole $C_6$ ketone and 0.03 mole $C_6$ alcohol. The $C_7$ ketone fraction recovered in this fashion had a high degree of purity as evidenced by a hydroxyl value (eq./100 g.) of but 0.030 and a Bromine No. (g./100 g.) of 1.7.

*Example II*

In this operation equi-molar amounts of methyl isobutyl ketone and methanol were reacted at elevated temperatures and pressures over a copper-alumina catalyst, the purpose of the reaction being to produce the $C_7$ ketone, ethyl isobutyl ketone (B. P. 136.5° C.). The reaction product obtained in this manner, on being condensed to a liquid, was divided in two portions. One was fractionally distilled to provide a number of different cuts, one of which boiled at 134 to 142° C. and contained most of the $C_7$ ketone. The apparatus employed to effect this distillation was a packed column containing the equivalent of about 20 trays, and the distillation was conducted using a 10 to 1 reflux ratio. However, despite the use of this highly efficient type of distillation unit, the 134–142° C. cut contained a total of about 15% of $C_6$ and $C_7$ alcohols, 1.5% $C_6$ ketone, a total of about 75.5% of $C_7$ and $C_8$ saturated ketones, and about 7% of an unsaturate, considered to be ethyl isobutenyl ketone.

The other portion of the condensate was also fractionated, though in this case the cut collected boiled between 125 and 175° C., the purpose of this distillation being to remove unreacted methanol, $C_6$ ketone, water and other light ends, as well as the material boiling above 175° C. (as bottoms). This 125 to 175° C. cut was then heated to 464° C. and the resulting vapors were passed through small, rough fragments of a brass (53% Cu–47% Zn) catalyst at atmospheric pressure and at an LHSV of 4. The effluent from this reactor unit was then condensed and the condensate was distilled in the same apparatus as described in the preceding paragraph. In this case, however, the cut collected at 134 to 142° C. contained 0% alcohols, 88% $C_7$ ketone, 10.5% $C_8$ ketone, and less than about 1% each of $C_6$ ketones and of unsaturates. By repeating the distillation the material can readily be freed of the $C_8$ ketone fraction, if desired, though this was not the case with the alcoholic impurities contained in the 134–142° C. cut described in the foregoing paragraph.

In the foregoing examples, the $C_6$ ketone (methyl isobutyl ketone), which is formed from the $C_6$ alcohol as the alcohol-ketone mixture is passed through the hydrogenation-dehydrogenation catalyst, is recycled back to the initial reactor unit for reaction with additional quantities of methanol. The $C_7$ alcohol present in the alcohol-ketone mixture is, of course, converted to the desired saturated $C_7$ ketone as the mixture is passed through the catalyst, as is the unsaturated ketone product ethyl isobutenyl ketone. Both of these factors, i. e., recycling the $C_6$ ketone and converting the $C_7$ ketone product, greatly increase the efficiency of the operation in addition to making it possible to recover the desired $C_7$ ketone product in the relatively pure condition by fractional distillation means.

It therefore forms a feature of the present invention, in addition to supplying an efficient ketone separation method, per se, to provide a continuous method for producing ketones which includes the steps of continuously reacting a lower ketone with an alcohol in a first reaction zone at elevated temperatures and pressures and in the presence of a catalyst to produce, among other products, a higher ketone as well as an alcohol having the same number of carbon atoms as the starting (lower) ketone; continuously passing a mixture of said higher ketone and said product alcohol through a second reaction zone containing a hydrogenation-dehydrogenation catalyst under conditions of low pressure and high temperature whereby said alcohol is converted to the corresponding (lower) ketone; continuously separating the lower and higher ketone components from the effluent from the second reaction zone; and continuously recycling the lower ketone back to the first reaction zone for reaction with additional quantities of the alcoholic starting material.

The various percentages expressed herein are on a weight basis unless otherwise indicated.

The invention claimed is:

1. The method for separating a ketone which is a monoketo-substituted acyclic hydrocarbon from a mixture of said ketone with an alcohol which is a monohydroxy-substituted acyclic hydrocarbon having a boiling point close to that of the ketone, comprising passing said mixture in the vapor phase through a hydrogenation-dehydrogenation catalyst at a temperature between about 200° C. and 550° C. and a pressure of about atmospheric to about 100 p. s. i. g., whereby the alcohol in said mixture is converted to a ketone having the same number of carbon atoms as the alcohol without substantial conversion of said starting ketone, and then separating the ketones present in the catalyst-treated mixture by distillation means.

2. The process in accordance with claim 1 wherein said ketone component of said mixture contains a total number of carbon atoms to the molecule which is one more than the total number of carbon atoms in said alcohol component of said mixture.

3. The method of claim 1 wherein the close-boiling mixture contains 2-methylpentan-4-ol together with ethyl isobutyl ketone.

4. The method of separating ethyl isobutyl ketone from a mixture containing said ketone together with 2-methylpentan-4-ol, comprising heating said mixture to a temperature between 275 and 550° C. and passing the resulting vaporous mixture through a brass catalyst at a pressure between 15 and 50 p. s. i. g. whereby the 2-methylpentan-4-ol is converted to methyl isobutyl ketone without substantial conversion of the ethyl isobutyl content, and then separating the ethyl isobutyl ketone from the methyl isobutyl ketone by distillation means.

5. The method for separating a saturated ketone which is a monoketo-substituted acyclic hydrocarbon from a mixture with an alcohol which is a monohydroxy-substituted acyclic hydrocarbon and an unsaturated component, each having a boiling point close to that of the ketone, comprising passing said mixture in the vapor phase through a hydrogenation-dehydrogenation catalyst at a temperature between about 200° C. and 550° C. and at a pressure of about atmospheric to about 100 p. s. i. g., whereby the alcohol is converted to a ketone having the same number of carbon atoms as the alcohol and the unsaturated component becomes saturated without substantial conversion of said starting ketone, and separating the saturated ketones present in the catalyst treated mixture by distillation means.

6. The method of claim 5 wherein the catalyst is composed of brass.

7. In a method for continuously producing a higher ketone which is a monoketo-substituted acyclic hydrocarbon from a lower ketone which is a monohydroxy-substituted acyclic hydrocarbon and an alcohol which is a monohydroxy-substituted acyclic hydrocarbon, the steps comprising continuously reacting said lower ketone with said alcohol in a first reaction zone at elevated temperatures and pressures to produce a mixture containing said higher ketone as well as an alcohol which is a monohydroxy-substituted acyclic hydrocarbon having a boiling point close to that of the higher ketone; continuously passing a mixture containing said higher ketone and close boiling alcohol through a second reaction zone containing a hydrogenation-dehydrogenation catalyst at a temperature between about 200° C. and 550° C. and at a pressure of about atmospheric to about 100 p. s. i. g. whereby said alcohol is converted to a ketone having the same number of carbon atoms as the alcohol without substantial conversion of said higher ketone; continuously separating the higher ketone and the ketone produced from said close-boiling alcohol from the other components of the effluent from the second reaction zone by distillation means; and continuously recycling the ketone, produced from the alcohol by passage over the hydrogenation-dehydrogenation catalyst, back to the first reaction zone.

8. In a method for continuously producing and recovering ethyl isobutyl ketone, the steps comprising continuously reacting methanol with methyl isobutyl ketone in a first reaction zone at elevated temperatures and pressures in the presence of a catalyst to produce a mixture containing 2-methylpentan-4-ol, ethyl isobutyl ketone and ethyl isobutenyl ketone as reaction products; continuously passing a mixture containing said reaction products through a second reaction zone containing a brass hydrogenation-dehydrogenation catalyst at a temperature between 275 and 550° C. and at a pressure between 15 and 50 p. s. i. g. whereby said 2-methylpentan-4-ol is converted to methyl isobutyl ketone and said ethyl isobutenyl ketone is converted to ethyl isobutyl ketone without substantial conversion of said ethyl isobutyl ketone; continuously separating the methyl isobutyl ketone and the ethyl isobutyl ketone from the other components of the effluent from the second reaction zone by distillation means; and continuously recycling the methyl isobutyl ketone so separated back to the first reaction zone for reaction with additional quantities of methanol.

References Cited in the file of this patent

UNITED STATES PATENTS

| | | |
|---|---|---|
| 1,952,702 | Simo | Mar. 27, 1934 |
| 1,978,404 | Bloomfield et al. | Oct. 30, 1934 |
| 2,066,496 | Taylor | Jan. 5, 1937 |
| 2,083,877 | Steck et al. | June 15, 1937 |
| 2,108,133 | McCall | Feb. 15, 1938 |
| 2,158,040 | Blumenfeld | May 9, 1939 |
| 2,200,216 | Loewenberg et al. | May 7, 1940 |
| 2,499,172 | Smith | Feb. 28, 1950 |